I. J. Merritt.
Dry Dock.
N° 72066. Patented Dec. 10, 1867.
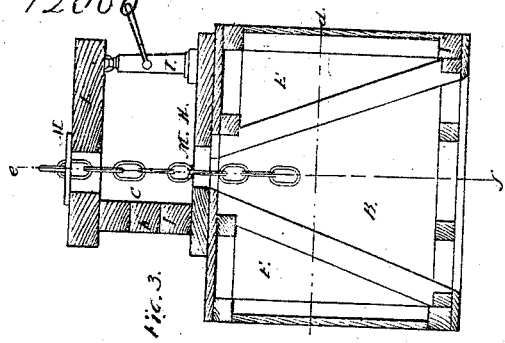
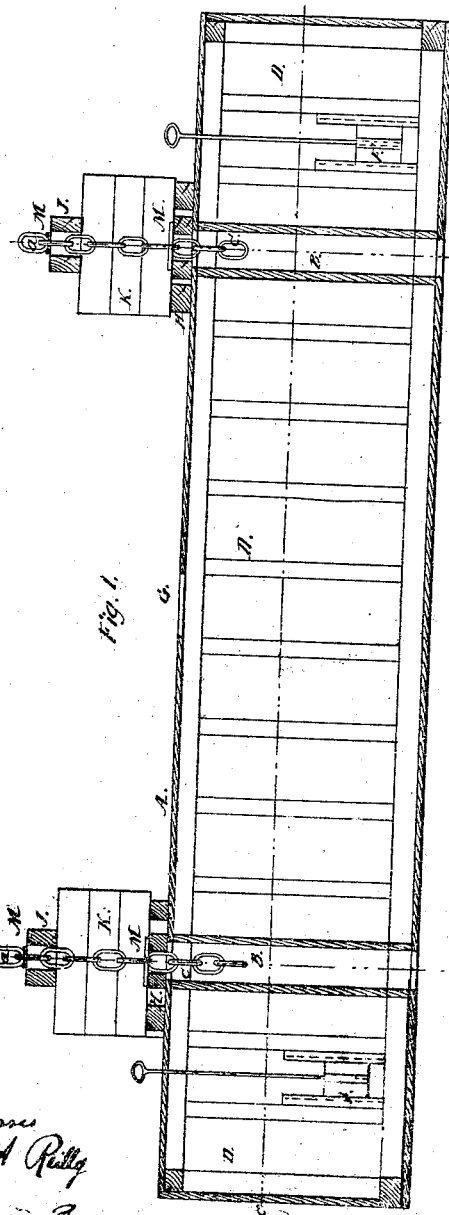
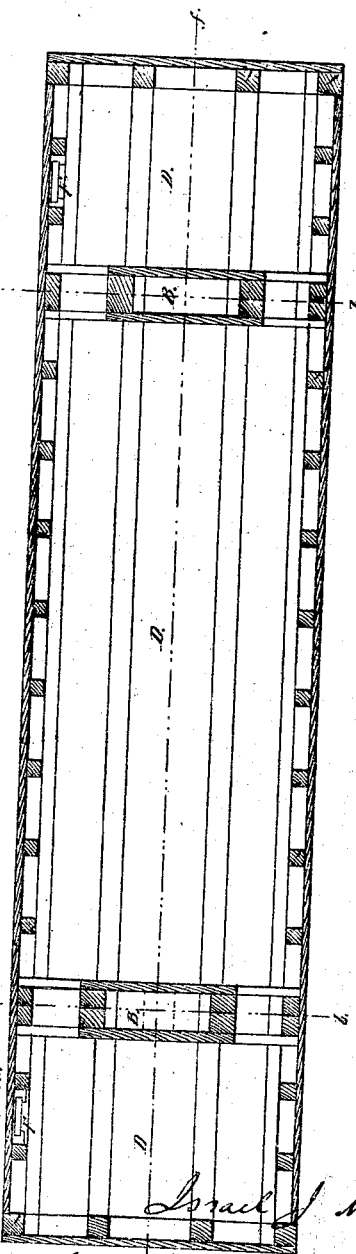
Witnesses
Alfred A. Reilly
Gustav Berg
Israel J. Merritt
By Van Santvoord & Hauff atty.

United States Patent Office.

ISRAEL J. MERRITT, OF NEW YORK, N. Y.

Letters Patent No. 72,066, dated December 10, 1867.

---

IMPROVEMENT IN DRY-DOCKS.

---

The Schedule referred to in these Letters Patent and making part of the same.

---

TO ALL WHOM IT MAY CONCERN:

Be it known that I, ISRAEL J. MERRITT, of 45 Wall street, New York, in the county of New York, and in the State of New York, have invented a new and useful Improvement in Portable Sectional Dry-Docks; and I do hereby declare that the following is a full, clear, and exact description thereof, which will enable those skilled in the art to make and use the same, reference being had to the accompanying drawing, forming part of this specification, in which drawing—

Figure 1 represents a longitudinal vertical section taken in the plane of the line $e\,f$ of fig. 2.

Figure 2 is a plan of a horizontal section in the plane of the line $c\,d$ of fig. 1.

Figure 3 is a cross-section taken through one of the wells in the plane of the line $a\,b$ of figs. 1 and 2.

Similar letters indicate corresponding parts.

This improvement relates to portable sectional dry-docks for raising sunken vessels or other objects, and it combines in a large degree simplicity and economy, both in its construction and operation.

The letter A designates a sectional floating-dock, consisting of an oblong air-tight box or vessel, of suitable size and strength, its dimensions being modified according to the circumstances under which it is to be used. The said dock or apparatus is made with one or more wells, B, two being shown in this example, which consist of vertical openings, that go through it from top to bottom, their mouths being placed at or as near as may be at the middle of the width of the dock. The said wells are made preferably of the form represented in the several figures of the drawing, widening out from above, so that the lower part nearly extends across the bottom of the box, while the upper part is of a suitable width to receive chains C or cables, which are sunk in the wells and go through or past the bottom of the box, and which are taken thence to the vessel or object to be raised or floated, to the sides of which the chains are fastened, or around which they are taken and secured in any convenient manner. The end spaces D D of the box communicate freely with the central space D, through the triangular openings E E, at the sides of the wells, so that the interior of the box forms, in effect, one chamber. But the interior may, if desired, be divided into two or more chambers. The letters F F designate water-gates, through which water is admitted when the apparatus is to be sunk or lowered, an opening, G, being provided in the deck for the escape of air. When the apparatus has been secured by the chains C to the vessel or object to be raised, a pump is applied at the opening G, and the water is removed from the box in order to raise it up again to or above the surface of the river or sea, the vessel or object to which it is attached by the chains being thereby raised from the bottom to the same extent. When the buoyant or lifting power of the apparatus (of which there are as many applied to the vessel or object to be raised as can be used to advantage) has been exhausted, I apply mechanical force to the chains in the manner next described.

Upon the top of the apparatus or box, across and around the mouth of each well B, I form a strong frame, H, of timber or other material, on one end of which I place a hydraulic or other lifting-jack, I, upon which or upon whose piston rests the free end of a lever, J, whose stationary end rests on a fulcrum, K, composed of blocks or of a connected framework placed on the deck. The lever J has a vertical opening, L, through it, directly above the mouth of the well, through which opening the chain C is taken, and at the top of which opening it is held or locked by means of bars or keys M going through or between adjacent links and across the said opening, so as to cause the chain to be sustained from said lever. The lever J is raised by the jack, and the chain or chains C being thereby drawn upwards, the sunken vessel or other object is consequently raised the same distance or height from the bottom on which it rests. The lever is next released from the chains, in order to lower it to its former position, so that it can be again raised. This is accomplished by securing the chain or chains at the mouth of the well, where I lock or secure them by means of keys M, that intersect the chains in the manner already described, and rest on the edges of the mouth of the well. After this is done, the lever is lowered without losing the advance already made in the work, and the chains are drawn up through the opening in the lever, and again fastened by a key or keys, M, as before, when the lever is again raised by the jack, and the operation proceeds in the manner above explained, until the work is completed, at each operation the sunken vessel or object being drawn or lifted upwards towards the surface of the water on which the dock is floating. As many sections or boxes, A, are used in the work as are found advantageous or necessary, the operations with the chains and levers of the various sections being carried on in more or less unison, so as to raise all parts of the sunken vessel or other object as nearly as possible at a uniform rate. If the sections A are made short, and only one well, B, is formed therein, the said well is placed at the middle of its length.

A modification which I make in the well consists in widening it out, also in fore-and-aft directions, as well as transversely to the length of the dock. I also modify it by making the well in the form of a cone, that is to say, its sides being widened outwards as they approach the bottom; the object in all these examples being to allow the chains to go towards the sunken vessel or object in a straight line, or in a line nearly straight from the point of support of the chains, or from the mouth of the well, to prevent friction, and to allow, as nearly as possible, the power to be applied to the vessel to be raised in a straight line, and also to prevent the dock from being careened by the action of the chains on its bottom, or on the bottom edge of the well.

What I claim as new, and desire to secure by Letters Patent, is—

1. The arrangement and combination, with a floating-section or dock, A, of one or more wells, through which a lifting-chain or chains are passed down to the vessel or object to be raised, substantially as shown and described.

2. The arrangement and combination of the lever J with the floating-dock or section A, and chain or chains C, substantially as described.

3. The shape of the well B, the same being made flaring from its top downwards, so as to allow the chains to go or be conducted from the mouth of the well directly towards the vessel or object to be raised, substantially as shown.

This specification signed by me, this 3d day of October, 1867.

ISRAEL J. MERRITT.

Witnesses:
JOHN PATERSON,
FRANK J. WELCH.